US006351361B1

(12) United States Patent
Kawazu et al.

(10) Patent No.: US 6,351,361 B1
(45) Date of Patent: Feb. 26, 2002

(54) OVERCURRENT PROTECTION DEVICE

(75) Inventors: Masami Kawazu; Hisaya Tamura; Norikazu Iwasaki, all of Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/549,203

(22) Filed: Apr. 13, 2000

(30) Foreign Application Priority Data

Apr. 23, 1999 (JP) .......................................... 11-117011
Dec. 15, 1999 (JP) .......................................... 11-356726

(51) Int. Cl.$^{7}$ .......................... H01H 85/04; H02H 5/04
(52) U.S. Cl. ...................... 361/103; 361/104; 361/93.8; 337/290
(58) Field of Search .......................... 361/54, 57, 93.1, 361/93.9, 103, 104, 106, 93.8; 337/158, 142, 290; 338/22 R, 20

(56) References Cited

U.S. PATENT DOCUMENTS 4,001,649 A * 1/1977 Young ........................ 361/106
5,640,293 A * 6/1997 Dawes et al. ................. 361/93
5,712,610 A * 1/1998 Takeichi et al. ............ 337/290
5,834,131 A * 11/1998 Lutz et al. ...................... 429/7
6,104,583 A * 8/2000 Wynn et al. .................... 361/7
6,114,672 A * 9/2000 Iwasaki et al. ............. 219/505

FOREIGN PATENT DOCUMENTS

JP A-8-161990 6/1996
JP A-8-236305 9/1996
JP A-10-116549 5/1998
JP A-10-116550 5/1998
JP B2-2790433 6/1998

* cited by examiner

*Primary Examiner*—Kim Huynh
(74) *Attorney, Agent, or Firm*—Oliff & Berridge, PLC

(57) ABSTRACT

An electrical current protection device capable of highly safe and rapid shutoff or suppression of electric current is disclosed. In addition to internal electrical current protection capabilities, external environmental triggers are also provided. The current protection device may include substrate-based thermal metallic fuse, PTC current-suppressing protection, thermal heat elements, integrated-circuit based voltage-drop detector, an FET-based current switch, and an external detector for environmental sensing and trigger.

8 Claims, 6 Drawing Sheets

1C

1E

1F (x — x cross section)

Prior Art

OVERCURRENT PROTECTION DEVICE

BACKGROUND OF THE INVENTION

1. Field of the Invention

The present invention relates to an overcurrent protection device for protecting a circuit to be protected from overcurrents by melting a low-melting element or tripping a PTC element.

2. Description of the Related Art

In conventional practice, current fuses composed of low-melting metal elements such as lead, tin, antimony, and the like and designed to evolve heat and to melt by an overcurrent are known as protection elements designed to prevent overcurrents from reaching circuits to be protected.

PTC elements are also known as such overcurrent-suppressing protection elements. A PTC element is a resistor element made of barium titanate or another inorganic component or obtained by dispersing electroconductive particles in a crystalline polymer material (for example, a polyolefin-based resin). When in an overcurrent mode, the element heats up, its resistance value increases, and the current flowing through the circuit to be protected is suppressed.

In another type of protection device, as shown in FIG. 11, FETs are connected in series with the circuit to be protected, an IC for detecting the voltage drop due to the FETs is also provided, the FETs are energized by the IC when the voltage drop due to the FETs exceeds a given value, and the FETs shuts off the current flowing through the circuit to be protected.

Typically, however, a fuse does not melt immediately after the current being carried exceeds the rated current, but does so only after a current somewhat greater than the rated current has been sustained for some time. For example, the UL standards define fuses as products which “melt within 60 seconds after a current twice the rated current flows.” The result is that, for example, a fuse rated a 3 A does not melt at less than 3 A and that there are as yet no products that would melt as a result of self-heating immediately after a level 1 mA above the 3 A has been reached.

Thus, the difference between the rated current and the shut-off current (current flowing during the melting of the fuse under actual conditions) is considerable in some fuses, and these fuses do not melt immediately after the actually flowing electrical current has exceeded the rated current. For some applications, such fuse characteristics are completely unacceptable.

PTC elements have the same drawback. Specifically, a PTC element will not trip unless it carries a current at least twice the rated current (non-tripping current value).

By contrast, a protection device obtained by combining an IC and FETs in the manner shown in FIG. 11 has a smaller difference between the rated and shut-off currents than in fuses or PTC elements. Because FETs are semiconductors, however, they are sometimes damaged by the application of voltage or electromagnetic waves, and this damage, although not a particular safety concern during current shut-off, is highly dangerous when the system is powered.

For safety reasons, protection devices should preferably be actuated not only when an overcurrent flows but also when ambient conditions (optical, magnetic, or dynamic) or external conditions (temperature, humidity, or the like) change abnormally for any reason.

SUMMARY OF THE INVENTION

It is an object of the present invention to overcome the above-described shortcomings of prior art and to provide an overcurrent protection device that is highly safe and is capable of rapidly shutting off or suppressing the electric current when a current exceeding a prescribed current value flows or when an abnormality is detected in the external operating environment.

Striving to attain the stated object, the inventors perfected the present invention upon discovering that an effective solution would be to heat a low-melting metal element or PTC element with a heating element rather than by self-heating under overcurrent conditions and to allow rapid heat evolution when the voltage drop quantity in the power line leading to the circuit to be protected exceeds a prescribed value or when an outside sensor for detecting abnormalities in the external operating environment detects an abnormality, and thus to provide a first detector element for detecting the voltage drop quantity in the low-melting metal element or PTC element or to provide an outside sensor for detecting abnormalities in the external operating environment, and also to provide a switching element for abruptly passing a large electric current through the heating element when the first detector element detects a prescribed voltage drop quantity or when an abnormality is detected by the outside sensor.

Specifically, the present invention provides an overcurrent protection device, comprising:

- a substrate;
- formed thereon a heating element and at least one of a low-melting metal element and a PTC element, the low-melting metal element being melted or the PTC element being tripped by the heat of the heating element;
- a first detector element for detecting the voltage drop in the power line leading to a circuit to be protected, or an outside sensor for detecting abnormalities in the external operating environment; and
- a switching element for passing a large electric current through the heating element and rapidly heating the heating element in accordance with the voltage drop quantity of the first detector element or the signal from the outside sensor.

In particular, a device in which an IC is used as the first detector element and in which an FET is used as the switching element is provided as such an overcurrent protection device.

These and other objects, features and advantages of the present invention are described in or will become apparent from the following detailed description of the invention.

DETAILED DESCRIPTION OF THE INVENTION

Figure 1:
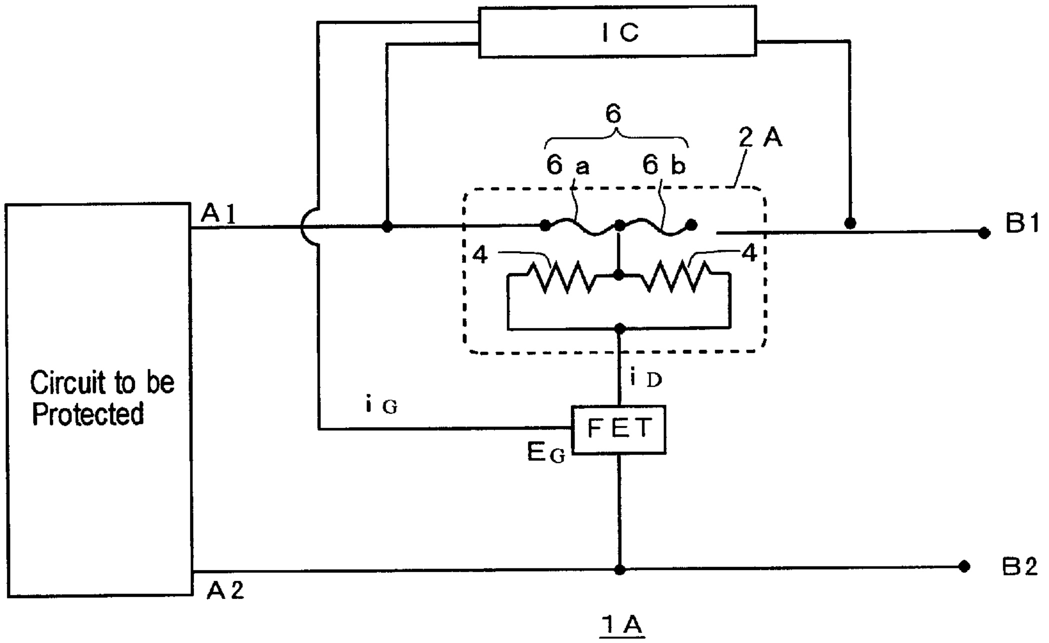
FIG. 1 is a circuit diagram depicting the overcurrent protection device of the present invention.

The overcurrent protection device of the present invention will now be described in detail with reference to the drawings. In the drawings, the same symbols denote identical or equivalent constituting elements.

FIG. 1 is a circuit diagram of an overcurrent protection device 1A according to the present invention. In the overcurrent protection device 1A, the power line leading to the circuit to be protected is provided with a protection element 2A, which is obtained by forming heating elements 4 and a low-melting metal element 6 on a substrate. An IC is provided as a first detector element for detecting the voltage drop of the protection element 2A, and FET is provided as a switching element for passing a large current through the heating elements 4 in accordance with the voltage drop quantity of the protection element 2A detected by the IC. Specifically, the FET varies the gate potential $E_G$ in accordance with the voltage drop quantity of the protection element 2A detected by the IC, and passes a large, rapidly increasing current through the heating elements 4 in accordance with the variations in the gate potential $E_G$.

Figure 10A:
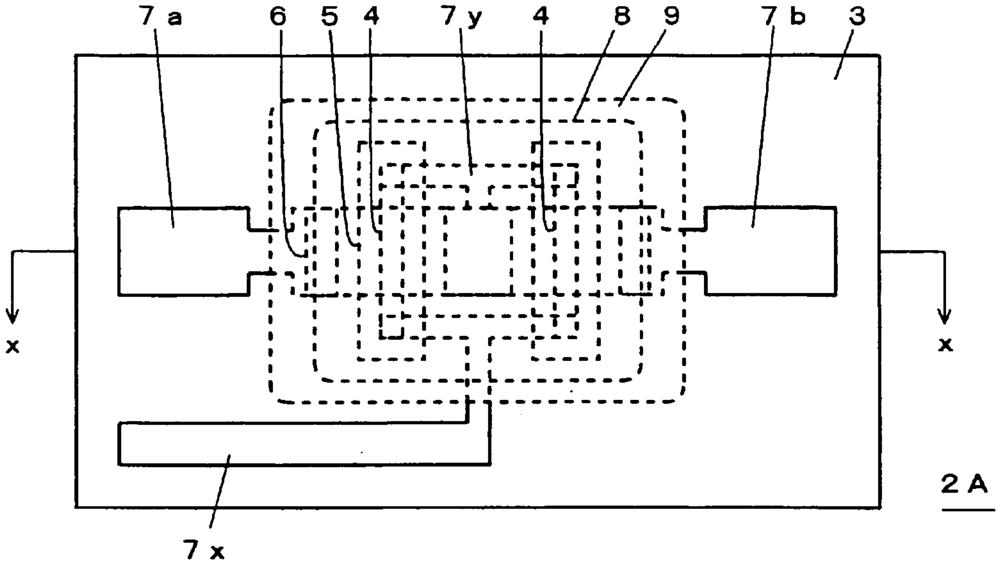
FIG. 10A and 10B are a plane view and a cross section of a protection element respectively that can be used for the overcurrent protection device of the present invention.
Figure 10B:
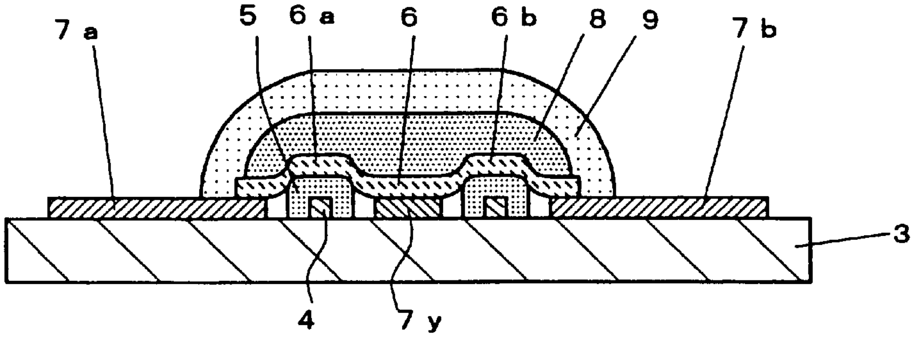
Figure 11:
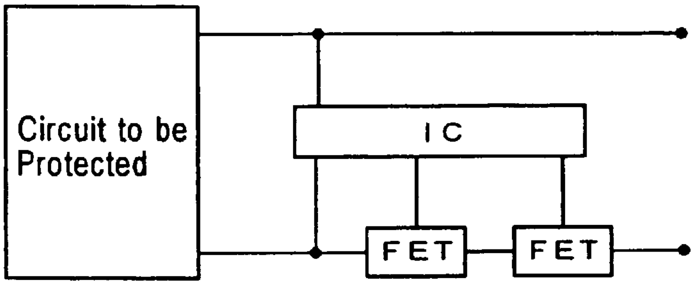
FIG. 11 is a circuit diagram of a conventional overcurrent protection device.

FIG. 10A and 10B are a plane view (FIG. 10A) and a cross section (FIG. 10B) of the protection element 2A. The protection element 2A is a conventional element (Japanese Patent No. 2790433, Japanese Patent Application Laid-open No. 8-161990) configured such that a low-melting metal element 6 is melted by the heat of heating elements 4. The element is obtained by the sequential stacking of the heating elements 4, an insulating layer 5, and the low-melting metal element 6 on a substrate 3.

The substrate 3 is not subject to any particular limitations and can be a plastic film, a glass epoxy substrate, a ceramic substrate, a metal substrate, or the like, of which an inorganic substrate is preferred.

The heating elements 4 may be formed, for example, by applying a resistance paste comprising an electroconductive material such as ruthenium oxide, carbon black, or the like and an inorganic binder such as water glass or the like or organic binder such as thermosetting resin or the like, and baking the paste as needed. The heating elements 4 may also be formed by a method in which thin films of ruthenium oxide, carbon black, or the like are printed, plated, vapor-deposited, or sputtered, and these films are pasted, laminated, or the like.

A low-melting metal element conventionally used as a fuse material can be employed to form the low-melting metal element 6. For example, it is possible to use the alloy listed in Table 1 (block 0019) of Japanese Patent Application Laid-open No. 8-161990.

In the protection element 2A in FIGS. 10A and 10B, 7*a* and 7*b* are electrodes for the low-melting metal element 6, and 7*x* and 7*y* are electrodes for two heating elements 4. The two heating elements 4 are connected together by one of these electrodes 7*y*. The numeral 8 is an internal seal composed of a solid flux or the like and designed to prevent the surface of the low-melting metal element 6 from oxidation, and 9 is an external seal composed of a material whose melting point or softening point is higher than that of the low-melting metal element 6. The external seal is designed to prevent molten material from flowing out of the protection element 2A during the melting of the low-melting metal element 6.

In the circuit diagram of the overcurrent protection device 1A in FIG. 1, the electrode terminals of a lithium ion battery, motor, or other circuit to be protected are connected, for example, to terminals A1 and A2, and the electrode terminals of a charger or other device connected to the circuit to be protected are connected to terminals B1 and B2. If the voltage drop of the protection element 2A exceeds a prescribed value under overcurrent conditions, the IC of the overcurrent protection device 1A is energized, the gate potential $E_G$ of the FET is changed, the FET is energized as a result, a gate current $i_G$ flows abruptly, a large, rapidly increasing drain current $i_D$ is caused to flow through the heating elements 4, and the heating elements 4 are rapidly heated. The resulting heat is abruptly transmitted to the low-melting metal element 6 on the heating elements 4, the low-melting metal element 6 is melted, and the overcurrent to the circuit to be protected is shut off. Because in this case the low-melting metal element 6 melts at two locations 6*a* and 6*b*, the current to the heating elements 4 is completely shut-off after the low-melting metal element 6 has melted.

Thus, the overcurrent protection device 1A is configured such that the low-melting metal element 6 of the protection element 2A is rapidly melted when an overcurrent exceeding a given value flows through the protection element 2A. Devices having prescribed operating voltages are appropriately selected as the IC for detecting the voltage drop of the protection element 2A and as the FET for energizing the heating elements 4, making it possible to arbitrarily set the amount of the electric current (amount of shut-off electric current) that allows the low-melting metal element 6 to melt under overcurrent conditions.

In addition, the FET is nonconductive under ordinary conditions, so a malfunction in the FET has no adverse effect on the circuit to be protected. Specifically, the low-melting metal element 6 is melted and the current is shut off if the FET malfunctions while on. Conversely, the heating elements 4 are not energized by the FET if the latter malfunctions while off. Although no heat is evolved by the heating elements 4 to melt the low-melting metal element 6, this element is still melted by self-heating under overcurrent conditions. It is thus possible to achieve the same level of safety as with a conventional current fuse.

Figure 2:
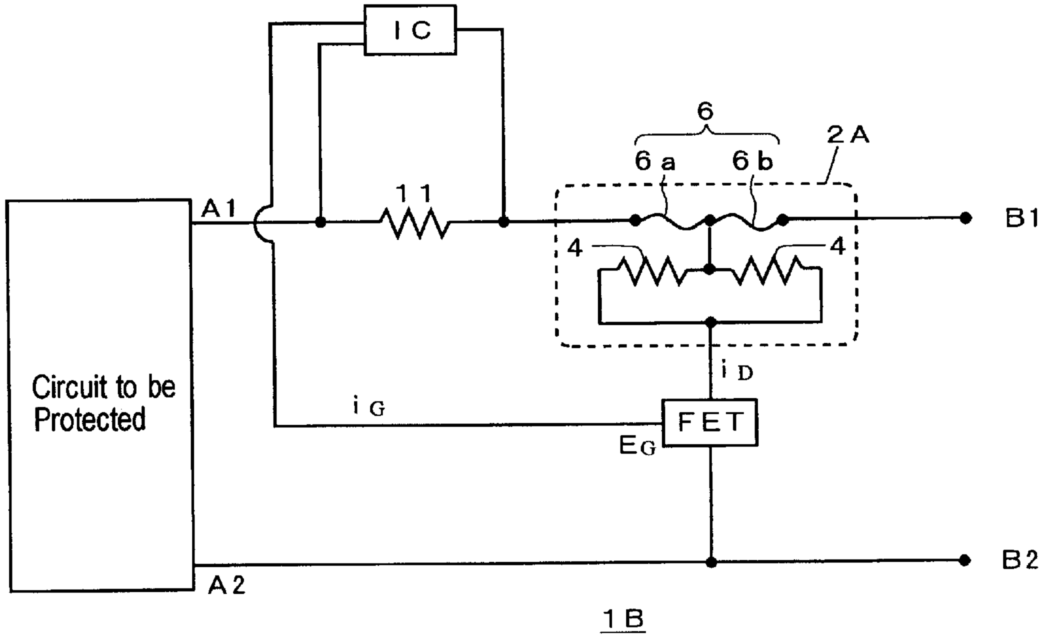
FIG. 2 is a circuit diagram depicting the overcurrent protection device according to another embodiment of the present invention.

FIG. 2 is a circuit diagram of an overcurrent protection device 1B according to another embodiment of the present invention. In the overcurrent protection device 1B, a resistor 11 is connected in series to the protection element 2A of the overcurrent protection device 1A in FIG. 1, and the IC (first detector element) is used to detect the voltage drop of this resistor 11. The IC of the overcurrent protection device 1B is therefore energized when the voltage drop of the resistor 11 exceeds a prescribed value, the FET is energized as a result, electric current is abruptly passed through the heating elements 4, and the heating elements 4 are rapidly heated.

Figure 3:
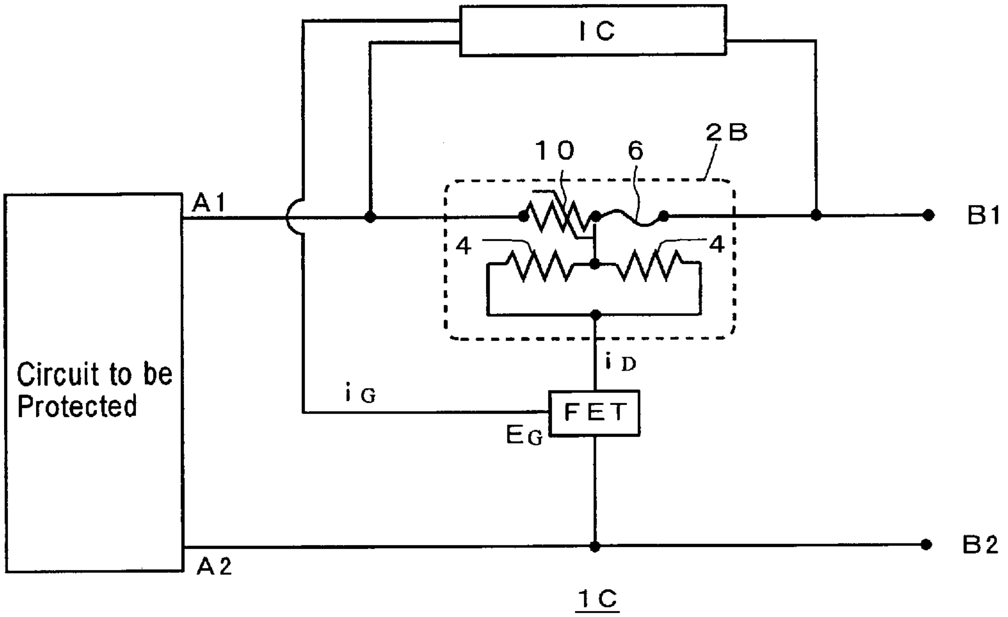
FIG. 3 is a circuit diagram depicting the overcurrent protection device according to another embodiment of the present invention.

FIG. 3 is a circuit diagram of an overcurrent protection device 1C according to another embodiment of the present invention. In the overcurrent protection device 1C, the protection element 2A of the overcurrent protection device 1A in FIG. 1 is replaced by a protection element 2B in which a PTC element 10 and a low-melting metal element 6 are both placed in the vicinity of the heating elements 4. A conventional element (Japanese Patent Application Laid-open No. 8-236305) can thus be used as the protection element 2B in which the PTC element 10 and low-melting metal element 6 are connected in series across the heating elements 4.

Using the protection element 2B makes it possible first to energize the PTC element 10 and to suppress the electric current by the heat of the heating elements 4 under overcurrent conditions, and to subsequently use the overcurrent protection device 1C if the electric current returns to its normal state following the current-suppressing action of the PTC element 10. The low-melting metal element 6 melts if the overcurrent continues to flow following the current-suppressing action of the PTC element 10. Consequently, the use of the protection element 2B causes the PTC element 10 to be energized first under overcurrent conditions, ensures maximum reusability for the circuit, and allows the circuit, which has to be protected, to be securely shielded from overcurrents by the action of the low-melting metal element 6.

Figure 4:
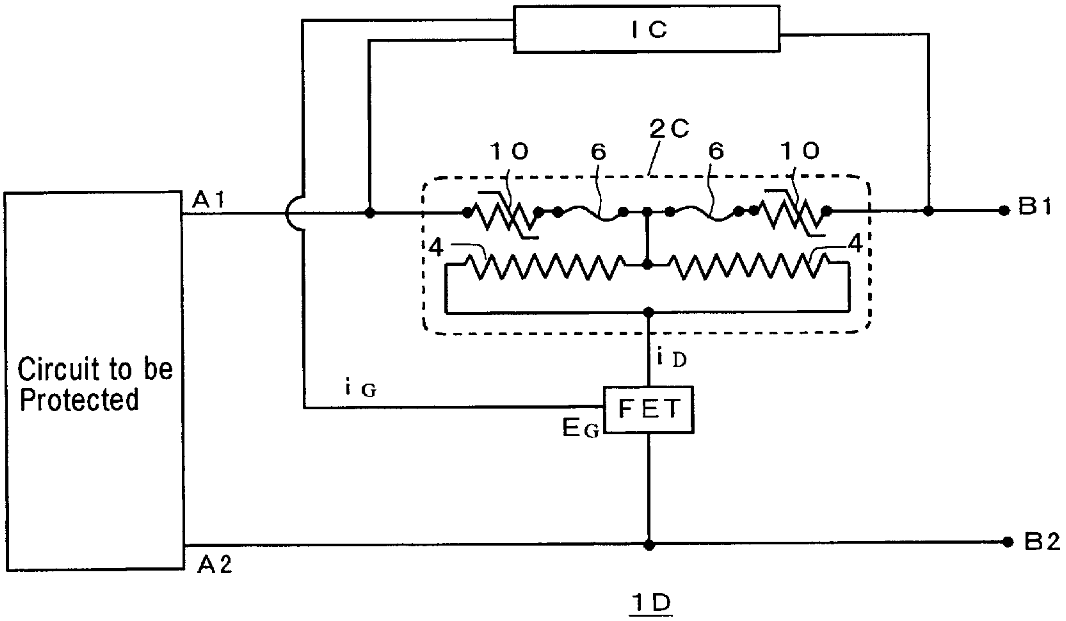
FIG. 4 is a circuit diagram depicting the overcurrent protection device according to another embodiment of the present invention.

The overcurrent protection device 1D in FIG. 4 is a modification of the overcurrent protection device 1C in FIG. 3. In the overcurrent protection device 1D, the protection element 2B described above is replaced by a protection element 2C provided with two groups of components, each of which is obtained by placing both the PTC element 10 and the low-melting metal element 6 in the vicinity of the heating elements 4. It is suggested in relation to the overcurrent protection device 1C in FIG. 3 that the energizing of the heating elements 4 be continued even after the low-melting metal element 6 has melted, whereas the overcurrent protection device 1D in FIG. 4 is configured such that the energizing of the heating elements 4 is completely shut off after the low-melting metal element 6 has melted, making it possible to achieve higher circuit safety.

Figure 5:
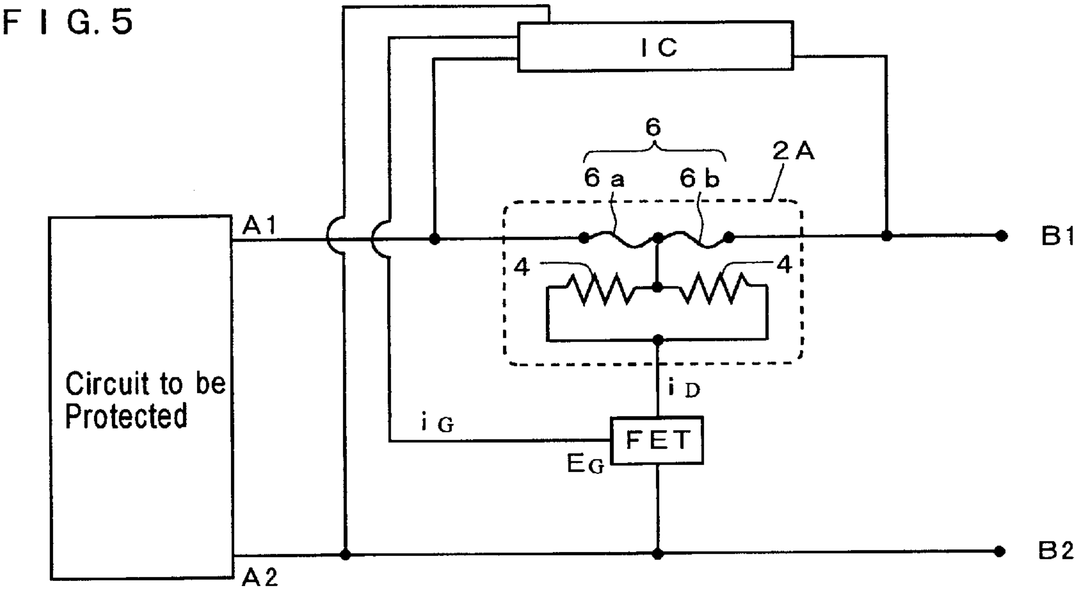
FIG. 5 is a circuit diagram depicting the overcurrent protection device according to another embodiment of the present invention.

FIG. 5 is a circuit diagram of yet another overcurrent protection device 1E according to the present invention. Unlike the IC of the overcurrent protection device 1A in FIG. 1, the IC of the overcurrent protection device 1E functions not only as a first detector element for detecting the voltage drop of the protection element 2A and energizing the FET, but also as a second detector element for detecting the terminal voltage of the circuit to be protected and energizing the FET in accordance with this terminal voltage. Not only can the overcurrent protection device 1E prevent an overcurrent from flowing through the circuit to be protected, but it also actuates the FET immediately after an overvoltage greater than a prescribed value is generated between the terminals A1 and A2 of the circuit to be protected, causes a large current to flow through the heating elements 4, rapidly heats the heating elements 4, and melts the low-melting metal element 6 at a fast pace. It is therefore possible to prevent a lithium ion battery or the like from developing an overcharge by connecting, for example, the electrode terminals of the lithium ion battery to terminals A1 and A2, and the electrode terminals of a charger or the like to terminals B1 and B2.

Figure 6:
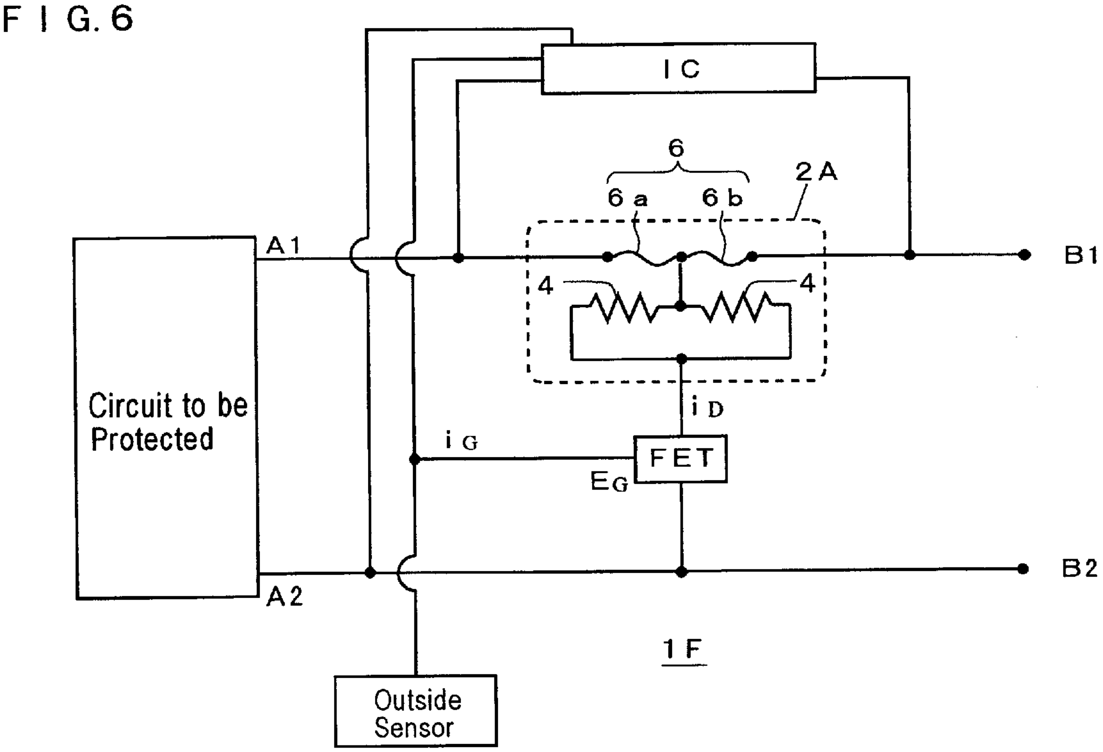
FIG. 6 is a circuit diagram depicting the overcurrent protection device according to another embodiment of the present invention.

FIG. 6 is a circuit diagram of an overcurrent protection device 1F obtained in accordance with the present invention by connecting an outside sensor to the terminals of the IC, itself connected to the FET in the overcurrent protection device 1E in FIG. 5. This overcurrent protection device 1F is capable not only of varying the gate potential $E_G$ of the FET in accordance with the voltage drop quantity of the protection element 2A or in accordance with the voltage between the terminals (A1, A2) of the circuit to be protected, but also of varying the gate potential $E_G$ Of the FET in accordance with a signal from the outside sensor, causing a large electric current to flow through the heating elements 4, melting the low-melting metal element 6, and shutting off the flow of electric current to the circuit to be protected.

Any device capable of generating a signal in accordance with abnormalities in the external operating environment can be used as the outside sensor in this case. Examples include photosensors, magnetic sensors, temperature sensors, humidity sensors, pressure sensors, velocity sensors, position sensors, flow sensors, gas sensors, and ion sensors. In more-specific terms, these include photoconductive elements, photodiodes, phototransistors, photocouplers, LCDs, pyroelectric infrared sensors, thermocouples, thermistors, posistor hole elements, magnetic resistance elements, pressure-sensitive diodes, piezoelectric elements, humidity sensors (those obtained using inorganic salts, ceramics, or polymer materials), gyros, and optical fibers. Together with transistors and other personal computer components, these sensors are used to build electronic circuits, and are designed to vary the gate potential $E_G$ of FETs in accordance with abnormalities in the external operating environment.

Figure 7:
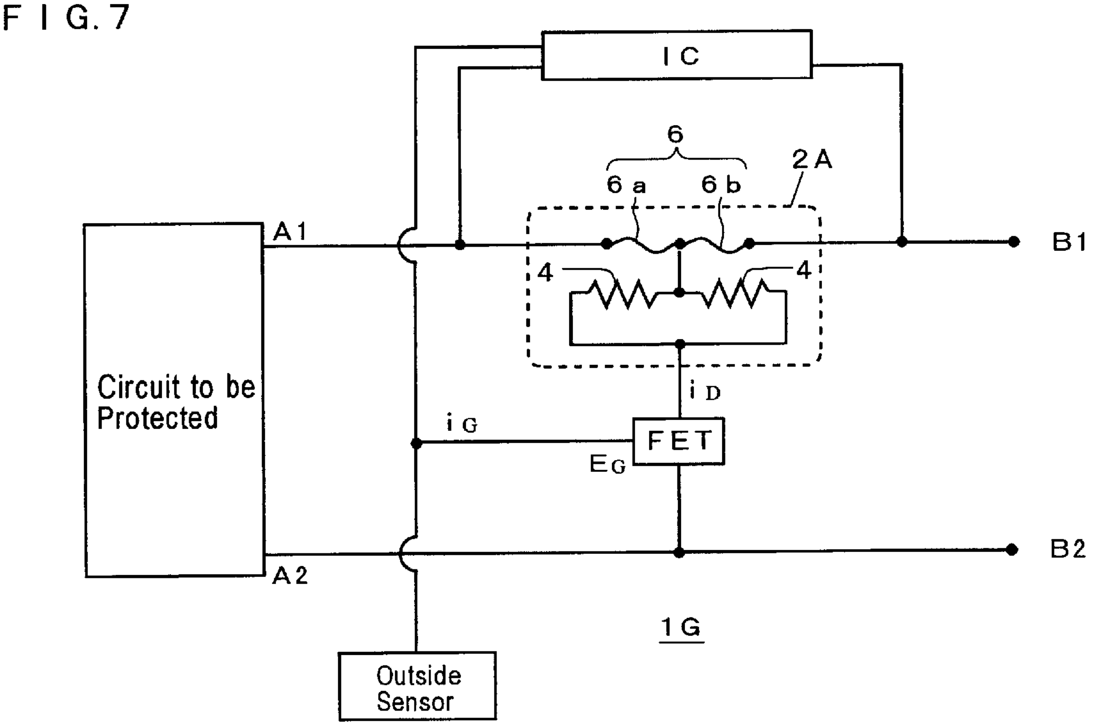
FIG. 7 is a circuit diagram depicting the overcurrent protection device according to another embodiment of the present invention.

Such an outside sensor can also be provided to the overcurrent protection devices 1A, 1B, 1C, and 1D of the present invention described above with reference to FIGS. 1 to 4. For example, FIG. 7 is a circuit diagram depicting the overcurrent protection device 1G of the present invention, obtained by connecting an outside sensor to the IC of the overcurrent protection device 1A in FIG. 1. As a result, the gate potential $E_G$ of the FET can be varied in accordance with the voltage drop quantity of the protection element 2A or in accordance with the signal from the outside sensor, causing a large electric current to flow through the heating elements 4, melting the low-melting metal element 6, and shutting off the flow of electric current to the circuit to be protected.

Figure 8:
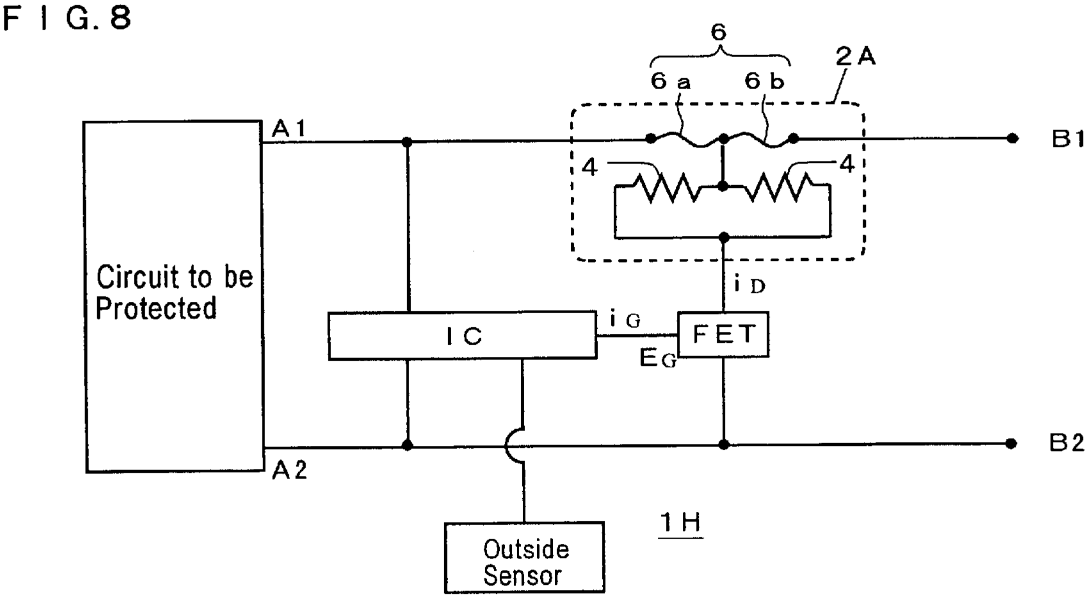
FIG. 8 is a circuit diagram depicting the overcurrent protection device according to another embodiment of the present invention.

FIG. 8 is a circuit diagram of another overcurrent protection device 1H according to the present invention. The overcurrent protection device 1H is obtained by modifying the overcurrent protection device 1G in FIG. 7 such that the IC no longer functions as a first detector element for detecting the voltage drop of the protection element 2A. Thus, the overcurrent protection device of the present invention also includes an arrangement in which the first detector element for detecting the voltage drop in the power line to the circuit to be protected can be dispensed with when an outside sensor is provided.

The present invention can have various other embodiments. It is possible, for example, to replace the FETs with common bipolar transistors, relays, or the like as the switching elements. FETs are preferred from the standpoint of device miniaturization, however.

In the protection element obtained by forming heating elements and a low-melting metal element on a substrate in accordance with the present invention, the low-melting metal element should be placed sufficiently close to the heating elements to allow the low-melting metal element to be rapidly melted by the heat of the heating elements. Consequently, an arrangement in which the heating elements and the low-melting metal element are arranged on the substrate in a planar configuration (as described in Japanese Patent Application Laid-open Nos. 10-116549 and 10-116550) and an arrangement in which the low-melting metal element is stacked over of the heating elements without an interposed insulating layer (as described in Japanese Patent Application No. 11-94385) may be used in addition to the arrangement in which the low-melting metal element 6 is stacked over the heating elements 4 with the interposed insulating layer 5 in the protection element 2A shown in FIGS. 10A and 10B.

Similar to the protection element in which heating elements and a PTC element are provided on the substrate, the PTC element should be disposed sufficiently close to the heating elements in order to ensure that the PTC element is rapidly tripped by the heat of the heating elements. Consequently, the PTC element may be stacked over the heating elements with an interposed insulating layer, arranged in a planar configuration with the heating elements, or stacked over the heating elements without an interposed insulating layer.

In addition, the first detector element, the switching element, and the second detector element may be configured as separate chips or may be integrated into a single chip that combines the functions of these elements.

EXAMPLES

The present invention will now be described in detail through Examples.

Example 1, Comparative Examples 1 and 2

The overcurrent protection device 1A shown in FIG. 1 was configured. The protection element 2A for this device was obtained by printing a ruthenium oxide paste (thickness: 10 $\mu$m) in the form of heating elements 4 on an alumina-based ceramic substrate 3, and forming an element measuring 1 mm×6 mm×100 $\mu$m and having an Sn:Pb ratio of 5:95 as a low-melting metal element 6 with an interposed insulating layer 5 (thickness: 10 $\mu$m) composed of water glass or another inorganic binder (see FIG. 10). The IC for detecting the voltage drop of the protection element 2A was S-80745SL (manufactured by Seiko Denshi Kogyo), and the FET for the abrupt passage of a large current through the heating elements 4 was CPH3403 (manufactured by Sanyo Electric).

The resulting overcurrent protection device 1A was measured to determine the following parameters: (a) rated current, (b) minimum guaranteed shut-off current value, and (c) operating time at the minimum guaranteed shut-off current value. A commercially available current fuse (rated current: 2 A) and a commercially available PTC element (rated current: 2 A) were also measured in the same manner as Comparative Examples 1 and 2 in order to determine (a) rated current, (b) minimum guaranteed shut-off current value, and (c) operating time at the minimum guaranteed shut-off current value. The results are shown in Table 1.

(a) Rated current: Maximum current value at which power can be supplied without melting or tripping.

(b) Minimum guaranteed shut-off current value: Minimum current value inevitably resulting in melting or tripping when power is supplied for not more than 120 seconds.

(c) Operating time at the minimum guaranteed shut-off current value: Time to melting or tripping when power is supplied at the minimum guaranteed shut-off current value.

TABLE 1

| | | Comparative Example | |
|---|---|---|---|
| Evaluated Items | Example 1 | 1 (Current fuse) | 2 (PCT element) |
| (a) | 2 A | 2 A | 2 A |
| (b) | (*1) | 3.5 A | 4 A |
| (c) | 5 sec. | 80 sec. | 100 sec. |

Note (*1)
Value can be set as needed but the device's action was confirmed at 3 A.

The results in Table 1 indicate that Example 1 of the present invention allowed the difference between the rated current and the shut-off current to be reduced, and the time between the moment the rated current was exceeded and the moment the current was shut-off to be significantly shortened.

Example 2

Figure 9:
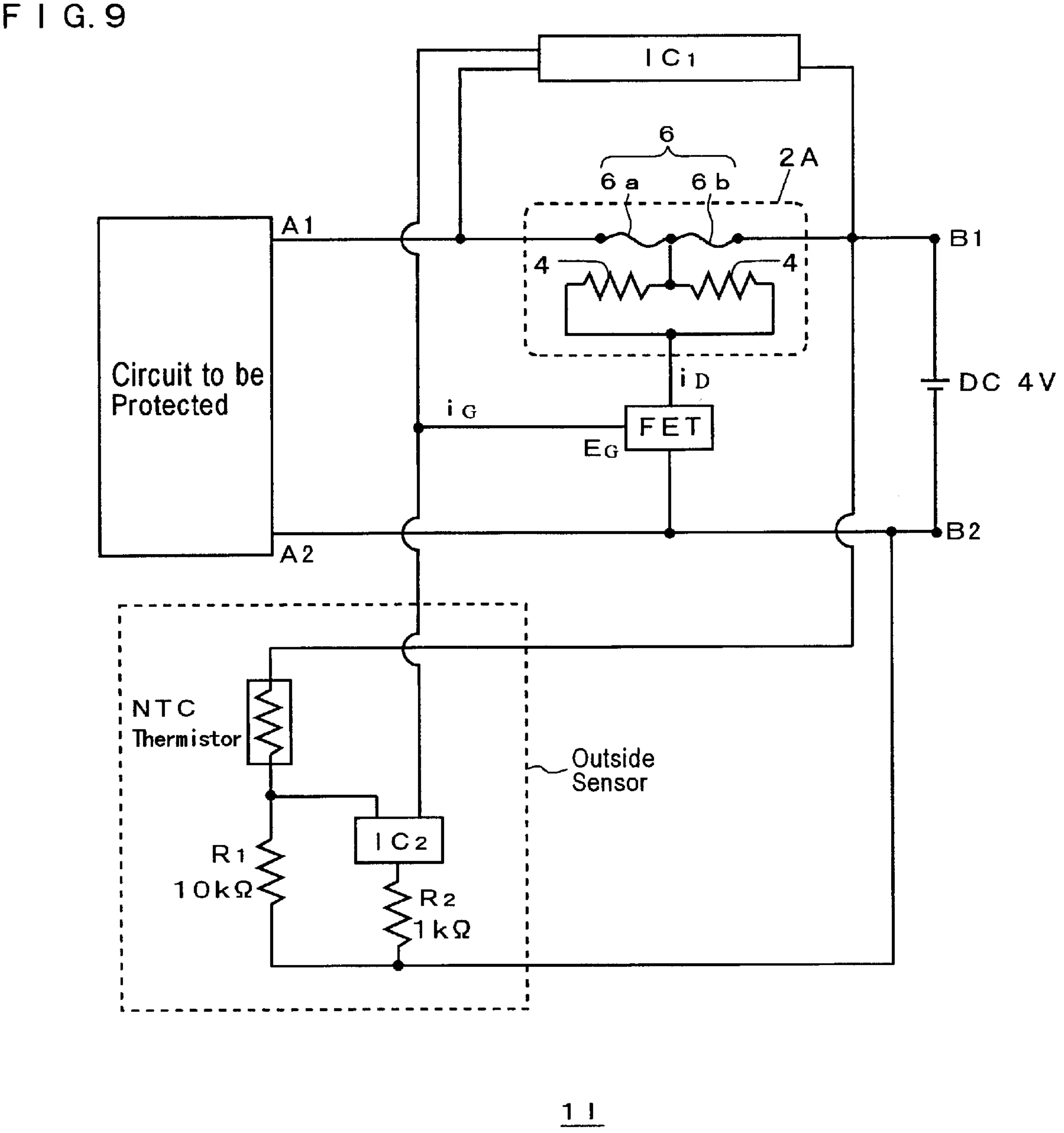
FIG. 9 is a circuit diagram depicting the overcurrent protection device according to another embodiment of the present invention.

An overcurrent protection device 1I was obtained by providing the overcurrent protection device 1G in FIG. 7 with an NTC thermistor as the outside sensor for detecting the ambient temperature, as shown in FIG. 9. In this case, the same components as those used in the overcurrent protection device 1A of Example 1 were used as the protection element 2A, FET, and $IC_1$ for detecting the voltage drops of the protection element 2A. DKF103B10 (manufactured by Bowthorpe Thermometrics; 10 kΩ±10% at 25° C.) was used as the NTC thermistor for the outside sensor. S-80737AL (manufactured by Seiko Denshi Kogyo; detection voltage: 3.7 V) was used as the $IC_2$ for the outside sensor, and 10 kΩ and 1 kΩ carbon film resistors were used as resistors $R_1$ and $R_2$, respectively.

The outside sensor was such that the resistance of the NTC thermistor decreased with increased ambient temperature, and the voltage applied to the NTC thermistor decreased in proportion to this resistance reduction. Consequently, the voltage applied to the resistor $R_1$ (10 kΩ) increased with an increase in ambient temperature. In addition, $IC_2$ detected the voltage drop of the resistor $R_1$ (10 kΩ) and sent a signal to FET when the detected voltage exceeded a given value. Consequently, the overcurrent protection device 1I having this outside sensor operated such that when the ambient temperature had exceeded a given value and the voltage drop quantity of the resistor $R_1$ (10 kΩ) had risen above a certain level, a signal voltage was applied to the FET from the $IC_2$ of the outside sensor, the gate potential $E_G$ of the FET was changed, a large current was passed through the heating elements 4, the low-melting metal element 6 was caused to melt, and the current to the circuit to be protected was shut-off.

A power source (DC 4 V) was connected between terminals B1 and B2, and when the ambient temperature varied between 25° C. and 110° C. and reached 100° C., a signal voltage was applied to the FET by the outside sensor, and the current to the circuit to be protected was shut off.

According to the present invention, it is possible to provide an overcurrent protection device that is highly safe and is capable of rapidly shutting off or suppressing the electric current when a current exceeding a prescribed current value is generated or when an abnormality is detected in the external operating environment.

The entire disclosure of the specifications, the claims, the drawings and the summaries of Japanese Patent Applications No. 11-117011 filed on Apr. 23, 1999 and No. 11-356726 filed on Dec. 15, 1999 are hereby incorporated by reference.

What is claimed is:

1. An overcurrent protection device, comprising:

a substrate;

a heating element, and at least one of a low-melting metal element and a PTC element formed on the substrate, the low-melting metal element being melted or the PTC element being tripped by heat of the heating element;

a first detector element for detecting a voltage drop in one of two power lines supplying power to a circuit to be protected; and a switching element for passing a large electric current through the heating element to rapidly heat the heating element based on a voltage drop quantity detected by the first detector element.

2. An overcurrent protection device according to claim 1, wherein an FET is used as the switching element.

3. An overcurrent protection device according to claim 2, wherein the low-melting metal element or PTC element is stacked over the heating element without an interposed insulating layer.

4. An overcurrent protection device according to claim 2, further comprising a second detector element for detecting a terminal voltage of the circuit to be protected, said switching element passing a large current through the heating element to rapidly heat the heating element based on the terminal voltage.

5. An overcurrent protection device according to claim 1, wherein the low-melting metal element or PTC element is stacked over the heating element without an interposed insulating layer.

6. An overcurrent protection device according to claim 5, further comprising a second detector element for detecting a terminal voltage of the circuit to be protected, said switching element passing a large current through the heating element to rapidly heat the heating element based on the terminal voltage.

7. An overcurrent protection device according to claim 1, further comprising a second detector element for detecting a terminal voltage of the circuit to be protected, said switching element passing a large current through the heating element to rapidly heat the heating element based on the terminal voltage.

8. The overcurrent protection device according to claim 1, further comprising an outside sensor for detecting abnormalities in the external operating environment, the switching element passing a large electric current through the heating element to rapidly heat the heating element based on a signal from the outside sensor.

* * * * *